United States Patent [19]

Wallin et al.

[11] 4,001,827
[45] Jan. 4, 1977

[54] CAMOUFLAGE MATERIAL

[75] Inventors: Erik W. Wallin; Gunnar Lindquist, both of Gamleby, Sweden

[73] Assignee: Barracudaverken AB, Djursholm, Sweden

[22] Filed: Mar. 31, 1976

[21] Appl. No.: 672,310

Related U.S. Application Data

[63] Continuation of Ser. No. 568,424, April 16, 1975, abandoned.

[52] U.S. Cl. .............................................. 343/18 A
[51] Int. Cl.² ........................................ H01Q 17/00
[58] Field of Search ................... 343/18 A; 568/424

[56] References Cited

UNITED STATES PATENTS

| | | | |
|---|---|---|---|
| 3,349,397 | 10/1967 | Rosenthal | 343/18 A |
| 3,454,947 | 7/1969 | Wesch | 343/18 A |
| 3,599,210 | 8/1971 | Stander | 343/18 A |
| 3,733,606 | 5/1973 | Johansson | 343/18 A |

*Primary Examiner*—T.H. Tubbesing
*Attorney, Agent, or Firm*—Roylance, Abrams, Berdo & Kaul

[57] ABSTRACT

Laminated, radar-defeating camouflage material for use under snowy, low-temperature conditions without delamination or undue decrease in flexibility at temperatures at least as low as −40° C.

8 Claims, 1 Drawing Figure

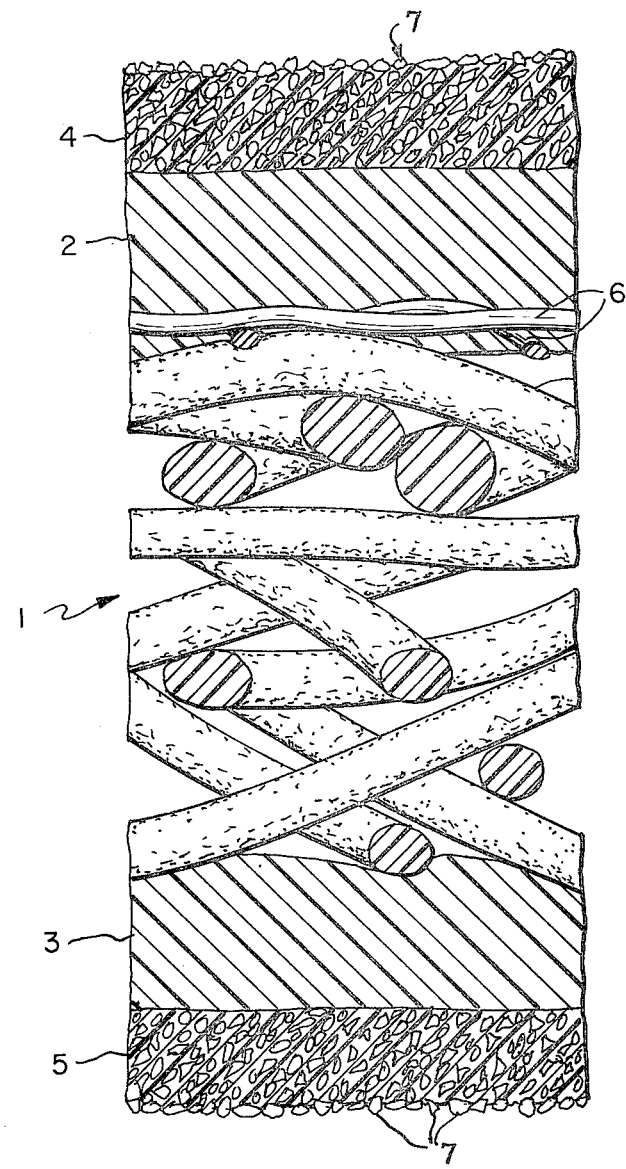

CAMOUFLAGE MATERIAL

This is a continuation of application Ser. No. 568,424, filed Apr. 16, 1975, now abandoned.

BACKGROUND OF THE INVENTION

Increased use of radar surveillance has required the provision of camouflage which, when draped over an object readily observable by radar, will defeat radar by providing over the area occupied by the object an apparent impedance substantially matching that of the surrounding terrain. Prior-art workers have been able to provide such camouflage which is effective under woodland and desert conditions, for example, such camouflage being made according to U.S. Pat. No. 3,733,606, issued May 15, 1973, to Sven-Goran Johansson. Since warfare requieres activities in snowy conditions, there has also been a continuing need for camouflage adapted to prevent detection of objects surrounded by snow, and excellent radar transparent camouflage materials are available, following the teachings of U.S. Pat. No. 3,300,325, issued Jan. 24, 1967, to G. W. Lindquist. However, attempts to produce radar defeating snow camouflage in flexible form, suitable to be draped over objects such as tanks, trucks and weapons, have not been generally successful.

Following accepted practices, radar defeating camouflage in flexible form requires use of a flexible web which has been made to present a predetermined impedance to incident electromagnetic ratiation, this usually being accomplished by securing to a fibrous web a multiplicity of tiny metal or graphite fibrils, and covering the fibril-bearing surface of the web with a film of a polymeric material, such as a polyvinyl chloride film cast from a plastisol onto a release web and, after curing to solid form, transferred to and adhered to the fibril-bearing surfce. The fibrous web is typically 0.1–0.25 millimeter thick and the adhered polymer film is typically 0.03–0.07 millimeter thick, so that the optical and physical characteristics of the fibrous web significantly affect the characteristics of the relatively thin finished laminate. When prior-art workers have attempted to provide radar defeating snow camouflage by applying directly to the fibrous web a film of material of a nature such as to match the reflectance characteristics of snow, the finished product had neither the desired physical properties nor the necessary reflectance characteristics. And attempts to apply a snow camouflage film over the polymer film conveniently adhered to the fibrous web have also failed to yield the necessary reflectance characteristics and, further, have resulted in a product which delaminates under low temperature conditions. There is thus a critical need for a satisfactory radar defeating snow camouflage.

OBJECTS OF THE INVENTION

A general object of the invention accordingly is to provide a flexible, radar-defeating camouflage material suitable for use in snowy terrain.

Another object is to devise camouflage material which is characterized by not only having the ultra-violet reflectance necessary for use as snow camouflage and radar defeating characteristics but also adequate flexibility to be draped at temperatures at least as low as −40° C. and freedom from delamination at such temperatures.

SUMMARY OF THE INVENTION

The invention stems from the discovery that, when a film of polymeric film, advantageously a film of polyvinyl chloride plasticized with a low temperature plasticizer, is adhered to the surface of a flexible web having the overall impedance characteristics required for defeating radar by absorbing and reflecting the radar signals, the polymeric film containing 5–50% of a white pigment, a surface layer according to the principles of Lindquist U.S. Pat. No. 3,300,325, when established on the surface of the polymeric film, will have optical reflectance characteristics approximating those of snow, despite presence of the radar defeating material, and the multi-layer material will be adequately flexible and free from tendencies to delaminate, at −40° C.

In order that the manner in which the foregoing and other objects are achieved according to the invention can be understood in detail, particularly advantageous embodiments thereof will be described with reference to the accompanying drawing, which forms part of the original disclosure of this application, and in which the single figure is a cross-sectional view of camouflage material according to the invention.

DETAIL DESCRIPTION OF THE INVENTION

The drawing illustrates a typical flexible camouflage material made according to the invention and comprising an intermediate web 1, polymeric films 2 and 3 which cover and are adhered to the respective major surfaces of web 1, and films 4 and 5 which cover and are adhered to the surfaces of films 2 and 3, respectively. The drawing is greatly enlarged, the actual thickness of web 1 typically being 0.1–0.25 millimeter, and films 2–5 each having a typical actual thickness of 0.04–0.08 millimeter.

In accordance with conventional U.S.A. practice for radar defeating camouflage web 1 is a non-woven web of fibers of a thermoplastic polymeric material, the fibers being fusion bonded, fiber-to-fiber, to establish a stable fabric. Typically, web 1 can be a "spun bonded nylon" non-woven web of the type marketed by Monsanto Chemical Co., St. Louis, Mo., under the trademark CEREX. To provide the web with an overall impedance such as to render the finished material radar defeating, metal or graphite fibrils 6 are distributed on one surface of web 1 in a random isotropic orientation, the fibrils being secured to the non-woven web by a suitable polymeric bonding material, typically an aqueous latex of a polyvinyl chloride-methyl acrylate copolymer highly plasticized with a phosphate ester type plasticizer. Typically, the fibrils are laid on the non-woven web by slurrying the fibrils in an aqueous liquid medium and flowing the liquid medium through and over the web while the web is being passed continuously through a substantial volume of the liquid medium, the web then being passed over a section box, the bonding material then being applied over the fibril-garnished surface of the web, and the web then passed through an oven for curing and drying. According to U.S.A. practice, the fibrils 6 are of stainless steel, and are applied in an amount and disposition to provide a radar reflectance power of about 40%, based on a metal plate of the same area, and a one-way transmission attenuation of at least 6 decibels. The fibrils are small, having a typical diameter in the range of 4 to 20 microns and lengths on the order of, e.g., 3–30 millimeters. Graphite fibrils are also employed and, while longer lengths appear to be preferred for graphite fibrils, present practice does not contemplate fibrils of any type longer than, e.g., 50 millimeters.

Films 2 and 3 are advantageously polyvinyl chloride films cast from a plastisol onto a release web and thermally fused. The films are laminated each onto a different major surface of web 1 by thermal bonding. This is accomplished by running the polyvinyl chloride film, still carried by the release web, into flush engagement with web 1 and applying sufficient heat to bring the polyvinyl chloride to the fusion point and sufficient pressure to assure a uniform bond. The laminate is then cooled and the release webs are stripped from the polyvinyl chloride films.

Films 4 and 5 are then applied, as by reverse roller coating, and cured in accordance with the requirements of the particular binder chosen in the formulations for these films, protuberance of the pigment particles resulting because of the high proportion of pigment and the film forming character of the binder.

Films 2 and 3 can be of any thermoplastic polymeric material which can be converted into a self-supporting film of a thickness in the range of 0.04–0.07 millimeter, with the film being adequately flexible to retain its integrity under conditions of camouflage use at low temperatures. Polyvinyl chloride is particularly advantageous because it can be cast from a plastisol into a film of precisely controlled thickness and can be compounded with plasticizers suitable for low temperature conditions. Other suitable polymeric materials include polyvinyl acetate, dispersion grade acrylates, including polyethyl acrylate and polymethyl methacrylate, and polyurethane.

Films 2 and 3 contain major proportions of at least one white pigment, typically titanium dioxide ranging from about 5 to about 50% of the total weight of the cured film, depending upon the specific nature of web 1 and fibrils 6, and the formulation of films 2 and 3. The main purpose of this white pigment content is to optically mask the intermediate web 1, and the fibrils 6 carried by web 1, so as to provide a background which is more nearly neutral from the standpoint of visible and near visible electromagnetic radiation.

With polyvinyl chloride employed as the polymeric material, films 2 and 3 can comprise 25–56% by weight polyvinyl chloride, 15–40% by weight total plasticizer and 5–50% by weight white pigment, the balance being made up by stabilizers, flame retardants and other conventional constituents. Since flame resistance is a required characteristic for the camouflage material, it is advantageous to include antimony trioxide, which is an excellent flame retardant, as well as a white pigment in the white pigment content of the layers 2 and 3, with the antimony trioxide amounting to 3–5% of the total weight of fused film, any balance of the total white pigment being made up by a less expensive pigment such as titanium dioxide. Since the cast polyvinyl chloride film must be thermally fused, a stabilizer is required to inhibit autocatalytic decomposition of the polyvinyl chloride. Any suitable conventional stabilizer or combination of stabilizers can be employed, and conventional barium-cadmium-zinc stabilizers are typical. Use of low temperature plasticizers for the polyvinyl chloride is highly advantageous. Typical low temperature plasticizers which can be used include dioctyl azelate, dioctyl phthalate, trioctyl phosphate, and dioctyl sebacate. Combinations of low temperature plasticizers with other plasticizers, such as dioctyl phthalate, can be employed. Typically, the initial plastisol can include 60–80 parts by weight total plasticizer per 100 parts by weight polyvinyl chloride, with the low temperature plasticizer present in an amount equal to at least 10 parts per 100 parts polyvinyl chloride. Additional additives, such as conventional fungicides, can be employed.

Outer films 4 and 5 are formulated according to Lindquist U.S. Pat. No. 3,300,325 and characterized by being so heavily loaded with at least one pigment which is highly reflective to light in the wavelength range of 3000–4000 Angstrom units that individual particles 7 of that pigment protrude from the exposed surface of the film. Thus, as will be clear from the drawing, the protruding pigment particles are present throughout the exposed surface of the film. Through protruding, the particles at the film surface are firmly anchored by the binder. Suitable pigments having such characteristics reflectivity include the sulfates, carbonates, silicates and oxides of barium, calcium, magnesium and antimony. Suitable film forming binders for the pigments include polyvinyl chloride copolymers such as copolymers of vinyl chloride and vinyl acetate, linseed oil alkyd, polyvinyl acetate, polyvinyl isobutyl ether, ethyl cellulose and nitrocellulose, such binders being dissolved in a solvent such as butyl acetate, xylene, toluene, ethyl acetate or alcohol, or dispersed or emulsified in a suitable aqueous medium, the use of a volatile organic solvent being preferable and advantageous. The pigment or pigments, binder and solvent are formulated in accordance with conventional paint practices so that, after evaporation of the solvent or liquid medium, particles 7 of the pigment or pigments protrude from the surface of the film, as shown, so that as a result the difference between the refractive index between pigment and binder and the refractive index between pigment and air is such that the film reflects light within the same range of wavelengths and to the same extent as the pigment contained in the layer. The proportion of the special pigment employed which will result in such protuberance varies with the choice of film forming binder. For most binders, an amount of pigment in the range of 50–75% of the total weight of the cured film will suffice. The pigment or pigments employed advantageously have an average maximum particle dimension in the range of 0.001–0.010 millimeter.

The drawing illustrates a camouflage material both sides of which exhibit reflectivity characteristics approximately those of snow. However, film 5 can be omitted, and film 3 can then be other than white. For example, with film 5 omitted, film 3 can be of a color suitable for camouflage under conditions other than snow.

When both sides of the camouflage material are for snow camouflage purposes, both films 4 and 5 being employed, and web 1 carries impedance elements such as fibrils 6 on one surface only, the film which covers the fibril-carrying surface of the web can be more heavily loaded with white pigment than is the film covering the other surface of the web. Thus, in the embodiment illustrated in the drawing, film 2 can contain substantially more white pigment than does film 3, so that better masking of fibrils 6 is achieved. For example, film 2 can include 23% titanium dioxide and 2% antimony trioxide, with film 3 containing 3% titanium dioxide and 2% antimony trioxide, the percentages being by weight based on the total weight of the cured film. Alternatively, when fibrils 6 or other impedance elements are present on one surface only of the intermediate web 1, the film which covers that surface can be relatively thicker and the film covering the other surface can be thinner. Thus, for example, film 2 can be 0.07 millimeter thick and the thickness of film 3 can be 0.05 millimeter.

The following example is illustrative:

EXAMPLE 1

A conventionally produced "spun bonded nylon" non-woven fabric web of approximately 0.08 millimeters in thickness, garnished with stainless steel fibrils of a diameter of 8 microns and a length of about 45 millimeters is employed as the intermediate web 1. The fibrils are laid on the nylon web in a random isotropic orientation and secured to the web by use of an aqueous polyvinyl chloride-methyl acrylate copolymer plasticized with a phosphate ester plasticizer. By standard U.S.A. Army test procedures, the web has a radar reflectance of 40% based on a metal plate of the same area, and a one-way transmission attenuation of 6–7 decibels.

Films 2 and 3 are established on a rayon release web by conventional film casting from a plastisol of the following composition:

| Ingredient | Parts by weight |
| --- | --- |
| Dispersion grade polyvinyl chloride | 100 |
| Dioctyl phthalate, plasticizer | 50 |
| Dioctyl azelate, plasticizer | 20 |
| Titanium dioxide, pigment | 20 |
| Antimony trioxide, pigment | 5 |
| Barium-cadmium-zinc stabilizer | 2 |

The plastisol is spread as a uniform coating on the running release web and cured by passing through an oven at 180° C., with a residence time of 2.5 minutes in the oven, the thickness of the plastisol coating being controlled, with use of a monitoring beta gage, to yield a cured polyvinyl chloride film having a thickness of 0.065 millimeter. Two such films are prepared, each on its own release web. Using a conventional laminating machine, the two polyvinyl chloride films are run each onto a different surface of the intermediate web and secured thereto by heat and pressure. The resulting lamination is run into a stripping machine and the two release webs ae stripped away, leaving a laminate consisting of web 1 and films 2 and 3, with the stainless steel fibrils 6 carried by web 1 and embedded in and adhered to the inner surface of film 2.

Films 4 and 5 are applied to the exposed surfaces of films 2 and 3, respectively, by reverse roller coating with a composition of the following formulation:

| Ingredient | Parts by weight |
| --- | --- |
| Calcium carbonate, pigment | 40 |
| Vinyl chloride-vinyl acetate copolymer | 16 |
| Butyl acetate as solvent | 44 |

The reverse roller coating operation is carried out sequentially to establish films 4 and 5 with each film, when cured by evaporation of the solvent, being approximately 0.055 millimeter in thickness. The cured films 4 and 5 are characterized by the fact that, throughout the entire extent of the film, individual particles 7 of the calcium carbonate pigment protrude from the exposed surface of the film, with the protruding particles being closely adjacent to each other and securely anchored in the film.

The finished product thus obtained is adequately flexible to be draped over objects to be protected against surveillance at temperatures as low as −40° C. and to be rolled, unrolled, folded, unfolded and crinkled at that temperature without delamination. As to electromagnetic radiation in the visible and near visible range, particularly in the wavelength range of 2000–4000 Angstrom units, the reflectance characteristics of the camouflage material are so close to those of snow as to prevent detection under snow conditions, and presence of films 2–5 has no deleterious effect on the radar-defeating characteristics of the intermediate web and fibrils 7.

What is claimed is:

1. In a camouflage material having radar-defeating capabilities and reflectance characteristics relative to visible and near visible electromagnetic radiations suitable for camouflaging under snow conditions, the combination of
   a flexible web having impedance characteristics which render the same radar-defeating;
   a first flexible film covering and adhered to one surface of said web,
      said first film being of a polymeric material and having at least one white pigment distributed therethrough in an amount equal to 5–50% of the total cured weight of said first film; and
   a second flexible film covering and adhered to said first film,
      said second film comprising a cured flexible binder heavily loaded with at least one white pigment which is highly reflective to light in the wavelength range of 3000–4000 Angstrom units,
      individual particles of said at least one white pigment protruding from the exposed surface of said second film but being anchored therein,
      the difference between the refractive index between said at least one pigment and said binder and the refractive index between said at least one pigment and air being such that said film reflects electromagnetic radiations within substantially the same range of wavelengths and to substantially the same extent as would said at least one pigment alone,
   said camouflage material being adequately flexible at −40° C. to be draped in camouflaging fashion and being capable of being rolled and unrolled at −40° C. without delamination.

2. The combination as defined in claim 1 and further comprising
   a third flexible film covering and adhered to the other surface of said web,
      said third film being of polymeric material and having at least one white pigment distributed therethrough in an amount equal to 5–50% of the total cured weight of said third film; and
   a fourth flexible film covering and adhered to said third film,
      said fourth film comprising a cured flexible binder heavily loaded with at least one white pigment which is highly reflective to light in the wavelength range of 3000–4000 Angstrom units, individual particles of said at least one pigment protruding from the exposed surface of said fourth film but being anchored therein, the difference between the refractive index between said at least one pigment and said binder and the refractive index between said at least one pigment and air being such that said film reflects electromagnetic radiations within substantially the same range of wavelengths and to substantially the same extent as would said at least one pigment alone.

3. The combination as defined in claim 2, wherein said flexible web is a non-woven thermally bonded web of thermoplastic polymeric fibers carrying conductive elements on said one surface.

4. The combination as defined in claim 3, wherein said first flexible film contains significantly more of said at least one white pigment than does said third flexible film.

5. The combination as defined in claim 1, wherein the white pigment content of said first flexible film comprises a flame retarding amount of antimony trioxide.

6. The combination as defined in claim 2, wherein the white pigment content of both said first and third films include a significant amount of antimony trioxide, and the white pigment content of said first flexible film includes a white pigment other than antimony trioxide in an amount greater than the antimony trioxide of that film.

7. The combination as defined in claim 1, wherein said first film is of polyvinyl chloride.

8. The combination as defined in claim 2, wherein said first and third films are of polyvinyl chloride.

* * * * *